(12) United States Patent
Taylor et al.

(10) Patent No.: US 6,935,376 B1
(45) Date of Patent: Aug. 30, 2005

(54) ENHANCEMENT OF PROFILED TUBULAR LINING SYSTEMS BY CHANNEL AUGMENTATION

(75) Inventors: Jack Curtis Taylor, Conroe, TX (US); Max Jerry Roach, deceased, late of Conroe, TX (US); by Louise F. Roach, legal representative, Conroe, TX (US)

(73) Assignee: Safetyliner Systems, LLC, Conroe, TX (US)

( * ) Notice: Subject to any disclaimer, the term of this patent is extended or adjusted under 35 U.S.C. 154(b) by 0 days.

(21) Appl. No.: 09/744,613

(22) PCT Filed: Jul. 28, 1999

(86) PCT No.: PCT/US99/16968
§ 371 (c)(1),
(2), (4) Date: Mar. 28, 2002

(87) PCT Pub. No.: WO00/06933
PCT Pub. Date: Feb. 10, 2000

Related U.S. Application Data
(60) Provisional application No. 60/094,326, filed on Jul. 28, 1998.

(51) Int. Cl.[7] .............................................. F16L 55/16
(52) U.S. Cl. .................... 138/98; 138/104; 138/112; 405/184.2
(58) Field of Search .......................... 138/97, 98, 104, 138/112; 405/184.2

(56) References Cited

U.S. PATENT DOCUMENTS

| | | | |
|---|---|---|---|
| 2,280,140 A | 4/1942 | Wilson | 158/42.1 |
| 3,526,086 A | 9/1970 | Morgan | 57/149 |
| 4,529,009 A | 7/1985 | Horner et al. | 138/111 |
| 5,108,533 A * | 4/1992 | Long, Jr. et al. | 156/294 |
| 5,172,730 A * | 12/1992 | Driver | 138/104 |
| 5,395,472 A * | 3/1995 | Mandich | 156/287 |
| 5,546,992 A * | 8/1996 | Chick et al. | 138/98 |
| 5,551,484 A * | 9/1996 | Charboneau | 138/104 |
| 5,606,997 A * | 3/1997 | Blackmore et al. | 138/98 |
| 5,794,662 A | 8/1998 | St. Onge et al. | 138/97 |
| 6,105,619 A * | 8/2000 | Kiest, Jr. | 138/98 |
| 6,146,491 A * | 11/2000 | Wood et al. | 156/344 |
| 6,220,079 B1 * | 4/2001 | Taylor et al. | 73/37 |
| 6,523,574 B1 * | 2/2003 | Taylor | 138/98 |
| 6,601,600 B1 * | 8/2003 | Taylor | 137/15.04 |
| 6,634,388 B1 * | 10/2003 | Taylor et al. | 138/114 |
| 6,644,356 B1 * | 11/2003 | Connor et al. | 138/98 |

* cited by examiner

*Primary Examiner*—James Hook
(74) *Attorney, Agent, or Firm*—Ostrolenk, Faber, Gerb & Soffen, LLP

(57) ABSTRACT

A tubular system made up of a tubular, a liner in the tubular, and longitudinally oriented members, which may be disposed within channels in the liner. The members advantageously may be used for pulling a liner into a host tubular, and/or maintaining the structural strength of the liner. The members are continuous along the length of the plastic-lined tubular, and if applicable, through intermediary joints. The channels may be in the inner and/or outer surfaces of the liner. The members may be usable for carrying electrical current or signals, fiberoptic signals, or data communications; for heating the liner; and or for detecting faults in the liner and/or the host tubular.

31 Claims, 14 Drawing Sheets

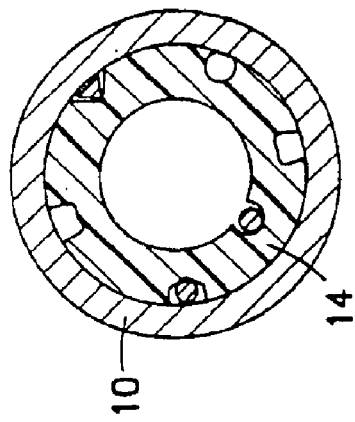
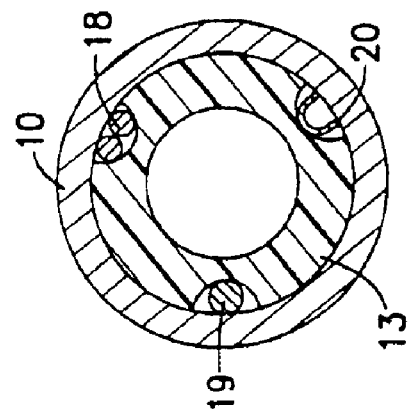
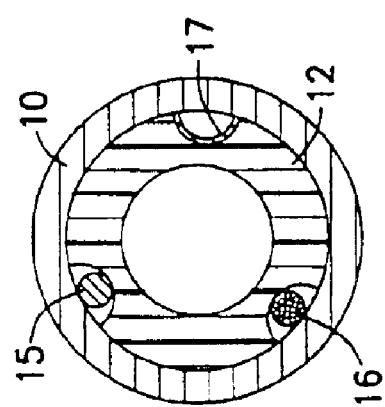

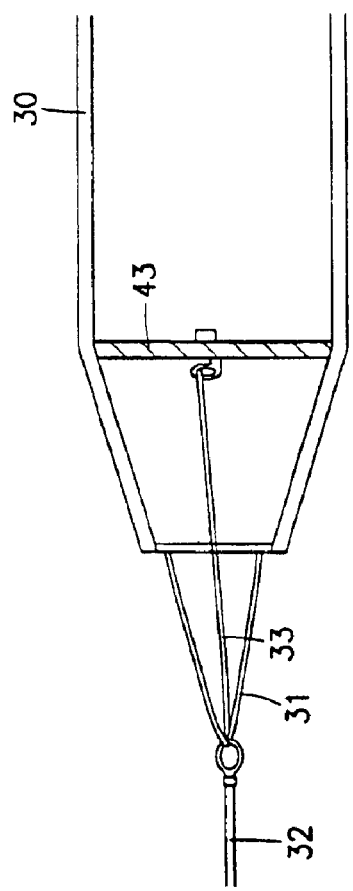
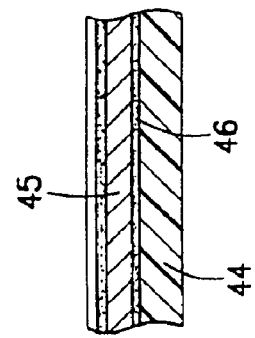
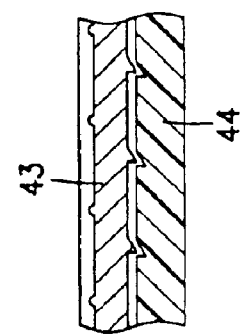
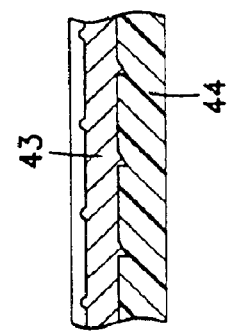

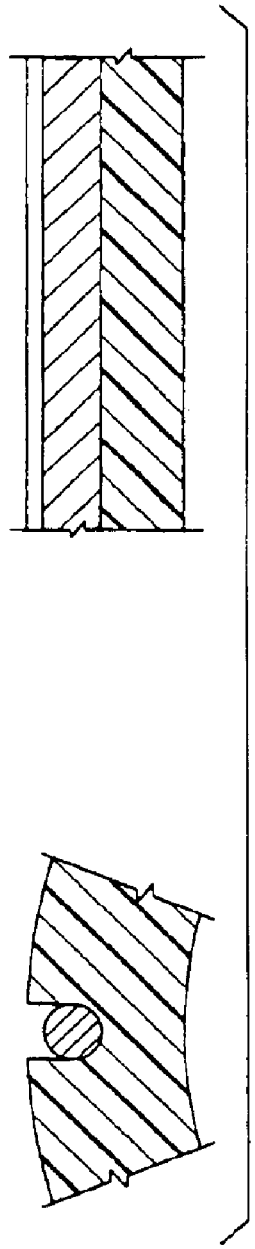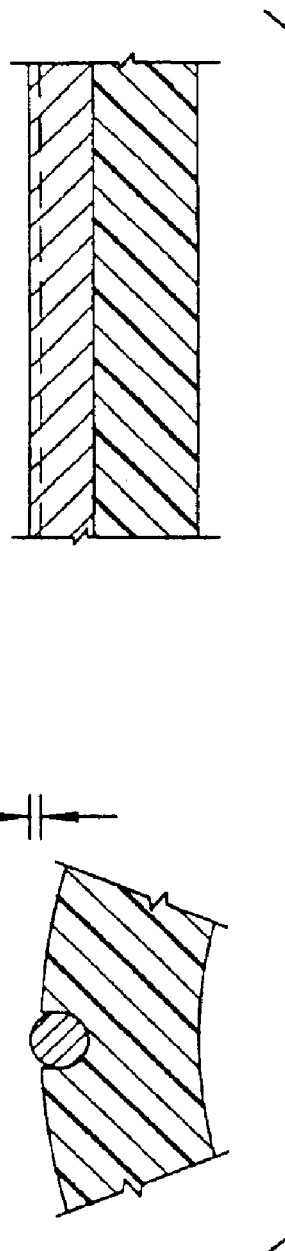

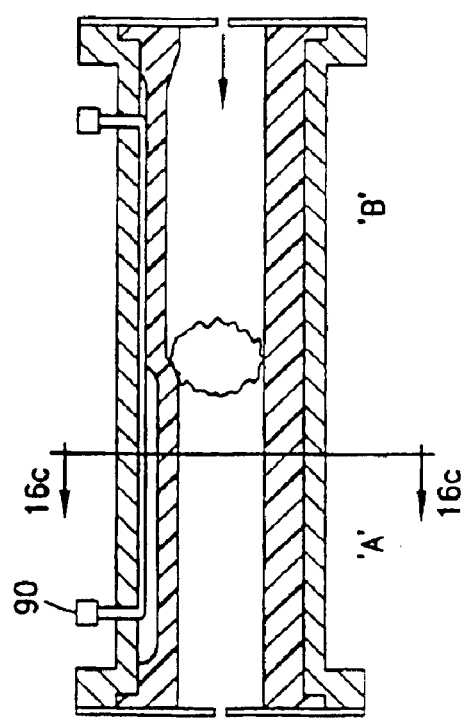

ENHANCEMENT OF PROFILED TUBULAR LINING SYSTEMS BY CHANNEL AUGMENTATION

CROSS-REFERENCE TO RELATED APPLICATIONS

This application is based on and claims priority from U.S. Provisional patent application 60/094,326 filed Jul. 28, 1998, in the name of Jack C. Taylor.

This application is related to Ser. No. 08/532,561 filed Jun. 4, 1990, now U.S. Pat. No. 5,072,622; and the following provisional applications, all filed in the name of Jack C. Taylor. Ser. No. 60/093,665 filed Jul. 22, 1998 and its corresponding PCT Intl. Appln. No. PCT/US99/16612 filed Jul. 22, 1999; Ser. No. 60/094,585 filed Jul. 29, 1998; and Ser. No. 60/138,814 filed Jun. 14, 1999.

Some, but not all, of the aspects of the invention described herein have been filed under the USPTO Document Disclosure program by Jack C. Taylor, under reference numbers 403965 (Aug. 28, 1996), 403966 (Aug. 28, 1996), 413924 (Jul. 21, 1997), 424712 (Sep. 18, 1997), and 430792 (Jan. 26, 1998).

The foregoing disclosures are incorporated by reference herein.

BACKGROUND OF THE INVENTION

Pipes and other tubulars have been lined with polymeric liners (e.g., polyethylene, nylon 11, etc.) for many years and several installation techniques are known to the art. These systems have been used principally in offshore and on shore pipelines, and in downhole production tubulars. Their scope has generally been limited to corrosion and erosion protection. However, they have also been used in monitoring for integrity of the composite liner-host system, as described in U.S. Pat. No. 5,072,622 (Roach & Whitehead).

Generally, the liner resides in close-tolerance with the host pipe along its length, forming a stable composite system, as shown in FIG. 1 which is, a cutaway end view of a tubular 10 with a line 11. The installed liner may be either of a loose-fit or a compressed-fit variety, both well known to the art. In all but low pressure applications, the stresses induced by fluid pressure from within the liner are transmitted to the surrounding 'host' tubular, and resisted by the same. The liner acts as an intermediary layer.

SUMMARY OF THE INVENTION

The invention described herein expands the range of possible applications of liners through utilization of longitudinally oriented members possibly disposed within channels in the surface of the liner body. The members advantageously may be used for pulling a liner into a host tubular, and/or for maintaining the structural strength of the liner. The embodiments of the invention further provide for continuity of the members along the length of the plastic-lined tubular, and if applicable, through intermediary joints.

The invention further provides for the channels to exist in the inner and/or outer surfaces of the liner.

The invention further relates to use of the members for carrying electrical current or signals, fiberoptic signals, and data communications; for heating the liner, and for detecting faults in the liner and/or the host tubular.

Other features and advantages of the invention will become apparent from the following description of embodiments thereof, which refers to the accompanying drawings.

BRIEF DESCRIPTION OF THE DRAWINGS

FIGS. 2a, 2b and 2c are respectively cross-sectional views of lined tubulars with members disposed in channels therein.

FIG. 6 is a schematic cross-sectional view of a liner and member system with an internal plug for the liner.

FIGS. 7a, 7b and 7c show members with respective surface enhancements contained in a channel.

FIG. 8a shows a cable not protruding from a liner channel and FIG. 8b shows a cable protruding from a liner channel.

FIGS. 16a, 16b and 16c, 16d and 17 are isometric and cross-sectional views showing differential stresses applied to cable members, FIGS. 16a–16d showing a strain gauge cable and FIG. 17 showing a fiber optic cable.

DETAILED DESCRIPTION OF EMBODIMENTS OF THE INVENTION

Figure 1:
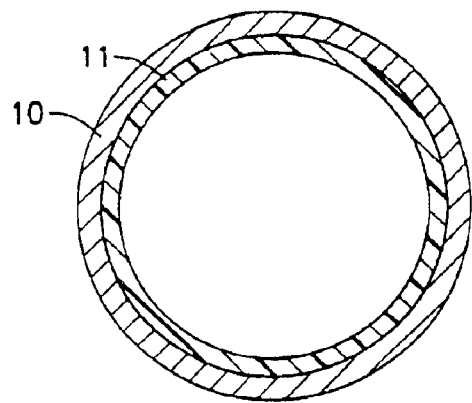
FIG. 1 is a cross-sectional view of a conventional line tubular.

FIGS. 2a–2c are cross-sectional views of a tubular 10, respective liners 12, 13 and 14, channels formed in the liners, and members disposed in the channels. In FIG. 2a the member 15 is a bar or wire, the member 16 is a cable, and the member 17 is part-cylindrical in cross-section. In FIG. 2b the member 18 comprises a pair of wires, the member 19 is a bar, and the member 20 is horseshoe-shaped. In FIG. 2c, six channels all have different shapes, five are formed on the outside surface of the liner 14 and one is formed on the inside surface of the liner 14.

Figure 3A:
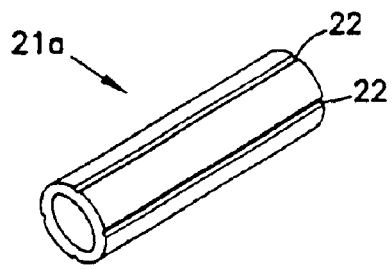
FIGS. 3a, 3b and 3c are respectively isometric views of channeled liners.
Figure 3B:
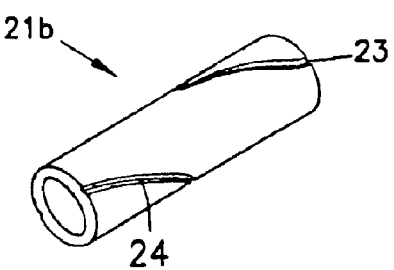
Figure 3C:
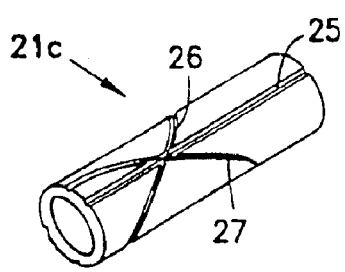

FIG. 3a shows a liner 21a with four straight longitudinal channels 22. FIG. 3b shows a liner 21b with two parallel helical channels 23 and 24. FIG. 3c shows a liner 21c with one straight channel 25 and two intersecting helical channels 26 and 27.

Thus, the members are located within one or more channels. In a preferred embodiment the channels are axially oriented. Equally, however, they may have wave shapes, radial, winding, or other nonlinear aspects. The channels need not be parallel, i.e., overlaps and inconsistent spacing between channels are permitted.

The shapes of the channels may vary. The shapes are advantageously coordinated with those of the corresponding members. For example, it the member to be disposed in a channel is rounded, such as a cable, a preferred embodiment of the channel cross-section is semicircular, as seen in FIG. 2a. Notwithstanding, channel profiles that are dissimilar to the member(s)' are permissible, provided functionality of the system is maintained (per FIGS. 2b & 2c).

Not all channels need to be of identical geometry. To accommodate differently sized and shaped members, the channels may have different corresponding cross-sections (per FIG. 2c).

Not all channels need contain members. Although several channels may be present in the inner and/or outer surface of the liner, only a portion of those need contain members (per FIG. 2c).

Not all members utilized in a liner need be identical in geometry or construction. As explained below, individual members may have different functions, so that the respective members may provide different corresponding benefits to the system. Thus, a variety of membertypes may be introduced into a single liner (per FIGS. 2a–2c).

Current liner systems are normally inserted into a host tubular by applying a tensile load from one end, e.g., pull-cables, or gravity weights. Further, individual installation segment lengths have been limited by the mechanical properties of the liner. Tensile loads, totally borne by the liner, continually climb throughout the insertion process. Accumulation of drag is generally proportional to distance pulled, and all the force is applied to the leading end of the liner. As a general rule, polyethylene liners are installed after temporarily reducing their overall diameter. For example, the known Titeliner™, system passes the liner through rollers before insertion into the tubular, while the Swageliner™, system passes the liner through a tapered die. The tensile load on the liner holds it contracted until the tension is released. With such systems, installation lengths tend to average 2500 ft., and the maximum permissible length is approximately 5000 feet. If longer lengths were attempted, the liner would simply be pulled apart.

The invention, however, extends the maximum permissible pull length. Lower installation cost is achieved, as fewer insertion operations will be involved in any multiple sectioned line. Another benefit is being able to insert a liner over long distances, into those lines where sectioning into short distances is impractical, or impossible; e.g., water crossings, restricted rights-of-way.

Figure 4A:
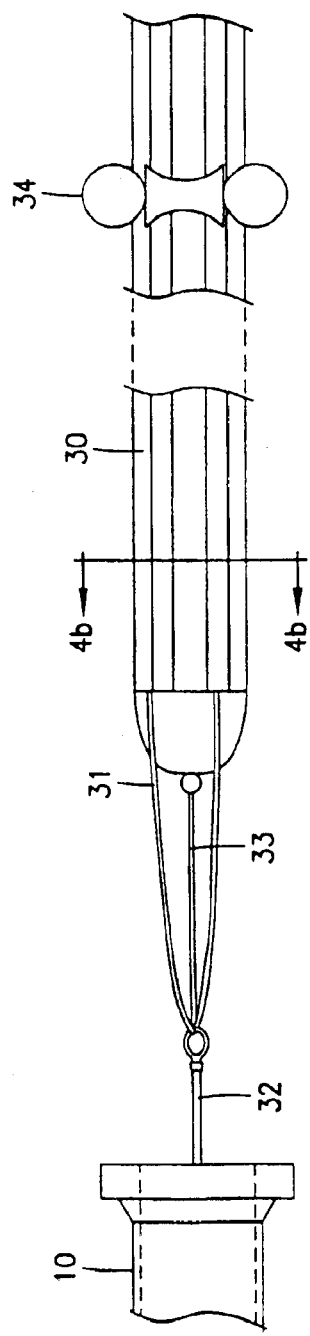
FIG. 4a is a schematic elevation and FIG. 4b is a cross-secton taken on line A—A in FIG. 4a, showing a liner and members being pulled into a host tubular.
Figure 4B:
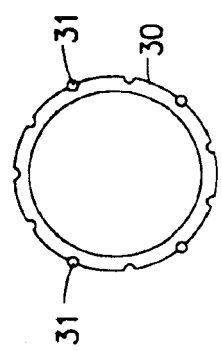

To effect this benefit, both the member and the liner are pulled into the host pipe together. FIGS. 4a is a schematic elevation sketch of a liner 30 and members 31 fastened together, being pulled toward the host tubular 10. FIG. 4b is a cross-section taken on line A—A in FIG. 4a. The members 31 are pulled in common by an insertion pulling cable 32. Optionally, the liner 30 may be pulled in addition by a liner pulling cable 33 connected to the cable 32. The members 31 share the longitudinal force and resultant stresses applied to liner 30. To derive this benefit, the member(s) must have higher unit tensile resistance properties than the liner. Accordingly, the overall resistance to stress is greater than that of the liner alone. Each member is positioned in a channel prior to the liner's insertion into the host tubular. They are then affixed to the liner by one of several methods, discussed below. Shear stress resistance at the plane between the liner and the member is sufficient to allow the two materials to, mechanically, behave in a composite fashion; the strain is equivalent.

Figure 5A:
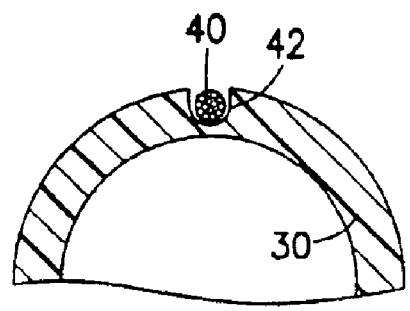
FIGS. 5a and 5b and 5c are schematic cross-sectional views showing respective stages in the insertion of a member into a liner and the liner into a host tubular.

In the disclosed embodiment, the liner 30 is inserted into the host tubular 10 after reducing its diameter with a four-roller assembly 34, which is known to the art. A member 40, sized for a close tolerance fit to the corresponding channel 42 (per FIG. 5a), is positioned in its respective channel prior to the diametric reduction step. The member 40 is a cable in this embodiment.

It is highly preferable to preserve the general shape of the liner 30 to best preserve its integrity when using this technique. FIG. 6 is a cutaway elevation of a liner and member system with an internal plug 43 to maintain the liner's round shape. Notwithstanding, the liner and member can be inserted with fold and form technologies, also known to the art, e.g., U-Line®, where such care is unnecessary. In such a system the liner is folded into a U-shaped cross-section before insertion, and after insertion is expanded with heat and internal pressure, or with internal pressure alone.

Figure 5B:
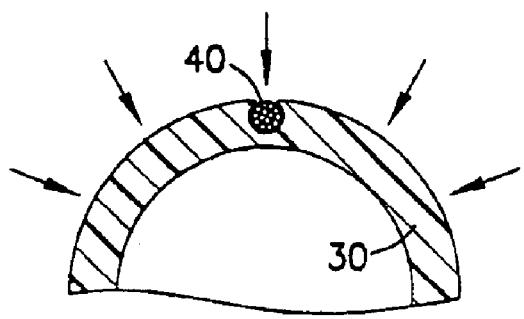

As the liner 30, now containing the member 40, is reduced in diameter as it is drawn through the apparatus 34, stresses of the reduction process will attempt to reduce the channel cross-section (per FIG. 5b). However, the member resists this effect, and becomes affixed to the liner due to compression, while the liner is reduced in diameter, throughout the entire insertion process.

The degree of affixation can be further enhanced by surface enhancements of the member. For example, a member 43 can be constructed with a barbed or knurled surface (per FIG. 7a). And when the liner 44 is compressed upon it, these irregularities indent themselves into the liner (FIG. 7b), thus providing more resistance to differential movement. As an extension of this example, the member may be heated to cause the liner to melt locally, where it contacts the member. This would further ensure penetration of the member's surface irregularities. Upon solidification of the melted polymer, the two would be effectively bonded. Further on this theme, a member 45 may be impregnated with a compound which adheres to the liner material, either under contact pressure, or at elevated temperatures (per FIG. 7c). Also, the channel itself may have such compound 46 loaded into it prior to the member's insertion. Any, or a combination of these will further enhance the effective bond between the liner and the member, beyond the bond provided merely by radial compression as described in the preceding paragraph.

If the member and liner are not effectively adhered, the liner may be subjected to the entire tensile load, allowing failure during installation from over-stressing. Adequately affixing the member to the liner, i.e., minimizing slip at the boundary layer between the two, however, assures that the stresses are resisted incrementally along the length of the liner. This results in the tensile load of insertion being carried by both the liner and the member, with corresponding strain rates being thereby equalized. In combination, the two are able to resist greater installation loads than the liner alone, permitting longer distances to be lined.

Figure 5C:
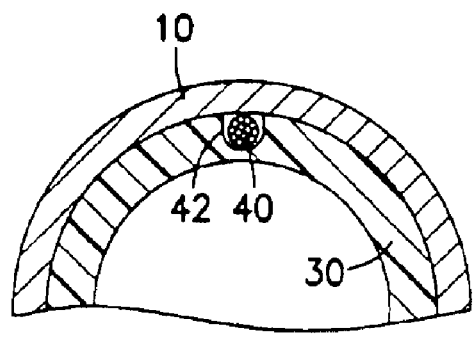

The liner is thus not permitted to be over-stretched to the point of plastic failure; unable to recover sufficient strain upon unloading. With the strain limited to an acceptable level within the liner's elastic behavior parameters, the liner can spontaneously expand radially to the desired close-tolerance fit within the host tubular (per FIG. 5c), after the insertion stress is released.

Thus, the channels provide effective protection for both the host tubular and the member. See FIG. 8a and FIG. 8b, which are cutaway elevations of members recessed within channels located in the outer surface of the liner. With sufficient channel depth, and/or diametric reduction induced 'clamping' it is possible and preferable for the outer surface of the member not to protrude beyond the outer surface of the liner. Take, for example, the case of a member which is a steel cable. Unsheltered cables, particularly of small effective diameters, can cause excessive pointwear on the host tubular during installation, particularly at bends (see FIG. 8b). Alternatively, the cable could fray prematurely due to friction with a host steel tubular. These concerns are mitigated when a member, in this case a cable, is effectively hidden and affixed within a channel (see FIG. 8a).

With the invention, the member(s) can be recovered, for reuse, for example. When the liner is inserted by the diametric reduction techniques, and subsequently the tension is released, it spontaneously expands radially. Concurrently, due to the geometry change, the clamping/adhesion experienced by the member within the channel, is relaxed (per FIG. 5c). Resistance to shear between the member and liner is greatly reduced. After the liner has been secured in position within the host tubular, tensile force can be applied to the member alone, pulling it through its channel, and out of the lined tubular system.

If the aforementioned process has used heat, i.e., melting and solidification (as in FIG. 7c), to improve adhesion, the process can be reversed. In the case of a cable, electric power can be fed once again through the cable, heating up the liner and/or bonding layer, thus freeing the member for withdrawal while the polymer is melted.

If the aforementioned process has used barbs to gain improved adhesion, the orientation of the barbs within the channels can be so arranged that upon release from compression the barbs can be withdrawn readily (per FIG. 7b), thus releasing the cable from the liner.

Figure 18B:
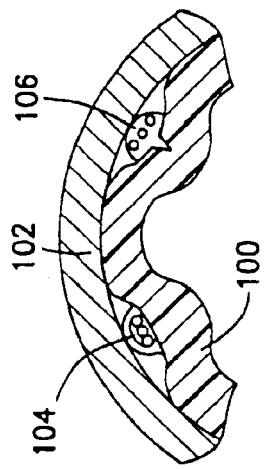
FIGS. 18a and 18b show an embodiment comprising conductive members disposed on a non-channeled liner within a host tubular.
Figure 18A:
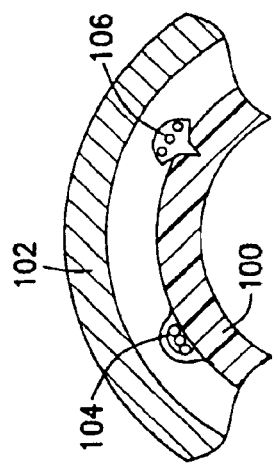

FIGS. 18a and 18b show an alternate embodiment wherein a non-channeled liner 100 is inserted in a tubular 102. Adhered to the liner 100 are elongated members 104, 106, which may be electrically conductive and/or resistive if desired (see FIG. 19 below), in addition to having the mechanical characteristics mentioned above. In this example. member 104 is secured to the liner by an adhesive or heat, for example, while the member 106 is secured to the liner by barbs. As shown in FIG. 18b, after pressurization the liner 100 engages the tubular 102 and the members 104, 106 deform the liner 100, thereby defining fluid flow passages.

The advantages of the embodiment of FIGS. 18a and 18b are the same as those described above.

Figure 9A:
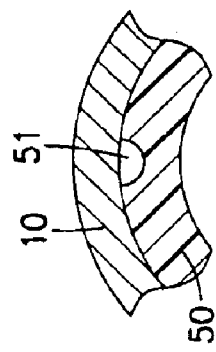
FIGS. 9a and 9b are cross sectional views of a host tubular and a liner, before and after an internal pressure increase.
Figure 9B:
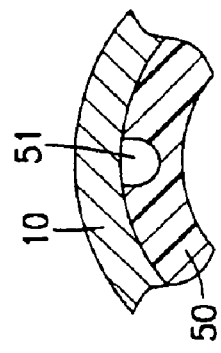

One of the most important benefits of the invention is that of extending the functional limits of the channels themselves, i.e., expanding the window of allowable operating conditions in which the channels can be used to improve the longevity of a given liner material. In the Roach & Whitehead patent, liner grooves are used in a monitoring and leak detection system. In other patent disclosures filed by the current inventor, channels are used to vent annular fluid to mitigate liner collapse potential, due for example to pressure imbalances, at line shutdown for example. Their effectiveness in these applications is limited by the properties and performance of the materials under the given operating conditions, however. In general, increased pressure will hasten the collapse of the channels, and thus reduce the cross-sectional area of the annular passage surrounding the liner, within the host pipe. This effect is compounded by temperature, as the liner material both softens and expands; reducing resistance to collapse, and expanding to fill the void of the channel itself. See FIGS. 9a and 9b, which are end cutaway sections of channeled liner 50 in a host 10, before and after the channel 51 contracts due to material expansion. Yet another deleterious effect, particularly for polyethylene liners in hydrocarbon service, is liner material swelling when it reacts upon contact with the fluid carried in the liner bore. This has the same effect as temperature, softening the material and causing it to expand; both detrimental to the geometry and function of the channel for the application.

Figure 10:
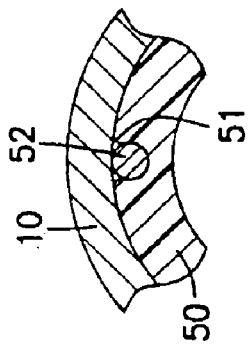
FIG. 10 is a cross-sectional view of a member in a liner channel.

However, members installed in channels can act as supports to resist the cross-sectional area reduction. See FIG. 10, which is a cutaway end section of a member 52 in a liner channel 51. Preferred embodiments of the members in this case are cables, and/or helical springs.

Figure 11:
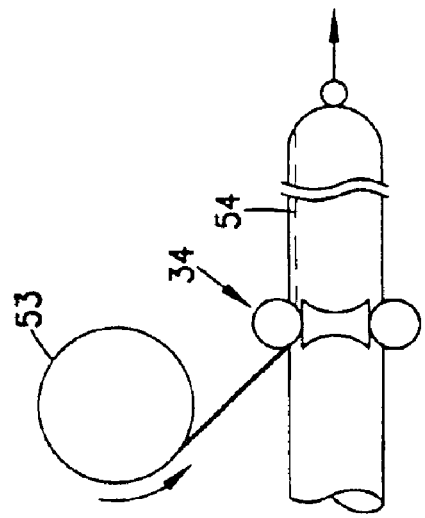
FIG. 11 is a schematic diagram showing system for insertion of a member into a channel.

Installation of either cables or spring members is readily accomplished. In one embodiment they are paid off a reel 53 adjacent to any installation equipment (34 in this example) at the liner entry point, and press-fitting into the channel 54 with a wheel (per FIG. 11).

Generally, the outward radial load due to pressure from within the liner is transmitted to the host pipe which resists the resultant hoop (radial) stress of the system. The force is transmitted both through the liner to the host, and, through the liner, then the member, to the host. The member therefore provides active resistance to collapse of the channel. However, for the channel to function as a fluid pathway, the member should not occupy the entire channel. With suitable member construction and geometry employed, sufficient cross sectional area can be maintained for venting and/or other fluid communication.

Figure 12A:
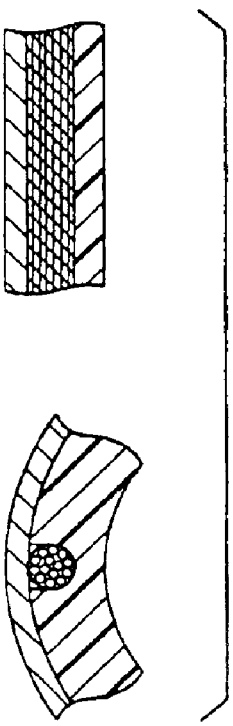
FIGS. 12a–12f are cross-sectional views showing various types of members accommodated in liner channels before (FIGS. 12a, 12b and 12c) and after (FIGS. 12d, 12e, 12f) an increase in liner bore pressure.
Figure 12B:
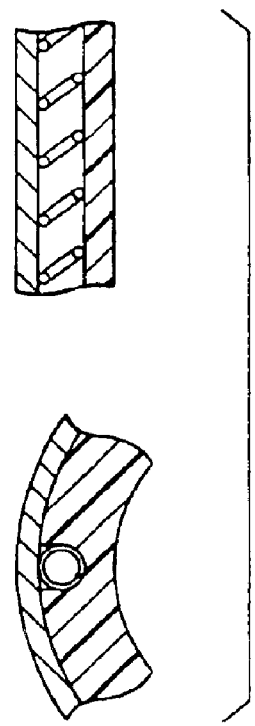
Figure 12C:
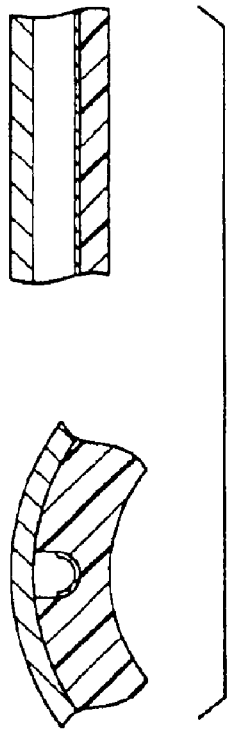
Figure 12D:
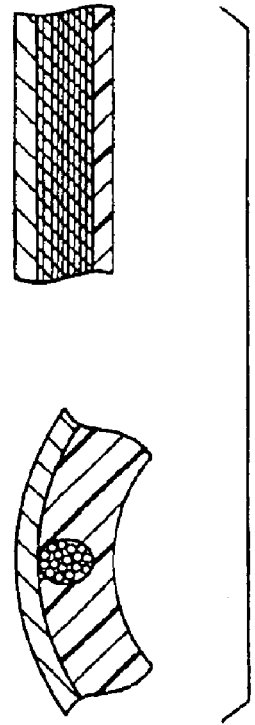
Figure 12E:
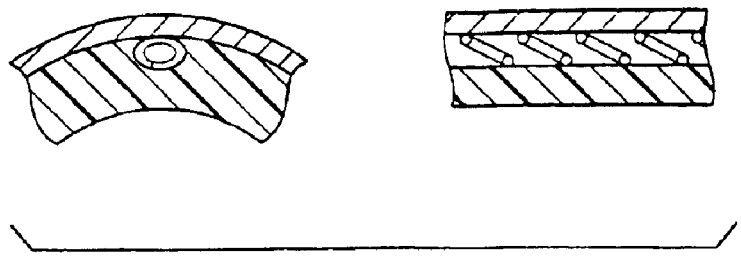
Figure 12F:
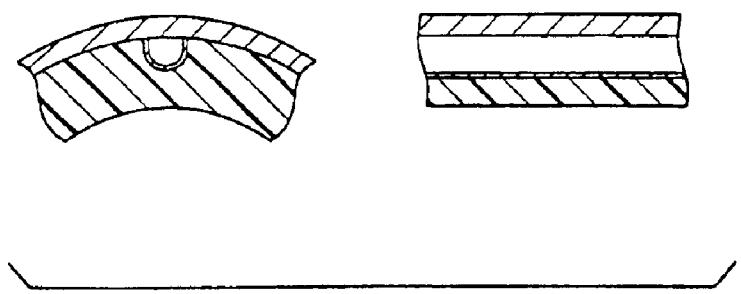

In one embodiment (see FIG. 12a), sufficient clear space is available between the member, and the liner at the outer surface of the liner even after pressurization (see FIG. 12d). (Although FIGS. 12a and 12d show a cable-type member, the same advantages apply to a bar-type member.) In another, space is made available within the member (see FIG. 12b and 12e), in which the member is a helical spring. The teachings of FIGS. 12b and 12e apply as well to members having hollow sections, interstitial openings, for example between cable fiber strands, etc. A member may also be an open section, e.g., a semicircular arch (see FIG. 12c and 12f). Members comprising hollow or open sections may be either solid or perforated.

Generally speaking, continuity may be provided by making the member of an effectively porous material, or by providing the member with lateral and longitudinal openings or perforations (such as a hollow member, a spring, or a cable with interstitial areas between the cable fiber strands) so as to permit fluid flow both into and along the member. In order to facilitate fluid flow, the member should not effect a seal which would prevent fluid permeating through the liner from reaching the annular pathway, or channel. Such a seal may occur, for example, when a solid semicircular member seated in a liner channel (see FIG. 12c) is displaced radially outward into intimate contact with the host pipe as the liner bore pressure is increased (see FIG. 12f). The edges of the member may intimately contact the host pipe, thus preventing permeating fluids from reaching the channel. In view of such considerations, therefore, a desirable alternative is to use a functionally porous member. In the above examples, the porous member may be a multi-strand cable or helical spring. Equally effectively, the desired porosity can be obtained by using a member made of an inherently porous material.

Figure 13:
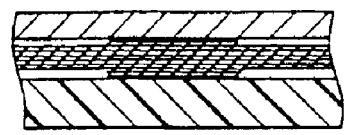
FIG. 13 shows a braided member in a liner channel.

There are potential difficulties with braided members owing to installation technique, particularly when a diametric reduction method is used. Upon unloading tensile insertion stress from a liner/member system, the liner will simultaneously expand radially and contract longitudinally, attempting to revert to its original geometry, or lowest potential energy. In some cases, the degree of liner contraction may be significantly greater than that of the member, particularly if the aforementioned affixation methods are not suitably employed. Localized differential slipping between the liner and the member may occur. In the case of a braided member, a 'birdcage' will form (see FIG. 13). If such occurrence is undesirable, it is best not to affix the member to the liner during installation. Rather, the member should be inserted into the liner channel relatively loosely, for minimal shear between the liner channel and the member, thus minimizing the potential for this problem to occur.

The use of a helical spring as the member within the channels is a highly preferred embodiment. It overcomes the potential difficulty with braided members discussed above. The spring member may be installed, tightly, at virtually any time in a multi-step or otherwise extensive diametric reduction process, and it can expand and contract with the liner through its loading, unloading and temperature cycles. The spring member concept may be less effective than a cable member, for example, in the extended insertion method described earlier, in which the cable protects the polyethylene liner from the stress of insertion, unless the spring constant of the helical spring is greater than the modulus of elasticity of the liner. However, the helical spring is highly effective for holding the channel open to maintain channel clearance. See FIGS. 12b and 12e. The member, as seen in transverse cross section, mimics a hollow tube, providing ample means for fluid movement and/or communication. In a longitudinal cross section, space between individual coils provides adequate area to receive annular fluids laterally into the member. Initially the spring member provides active resistance in support of the liner channel (FIG. 12b). When the operating pressure increases sufficiently, the spring member will reorient itself, assuming a lower vertical dimension (FIG. 12e), i.e., radially with respect to the liner/host system. The assumption of such a profile provides another threshold of effective resistance to liner channel collapse. Although the cross-sectional area will be somewhat diminished in this geometry, it will remain effective for its intended purpose.

In addition to the benefits above, i.e., allowing longer insertion lengths and holding the channel open, cable-type members have further advantages.

Specifically, a member located in the channel can be manufactured of an electrically and/or optically conductive material, e.g., conductive or fiberoptic cable. Thus, it can be used to carry electricity and/or data communications from end-to-end.

As described earlier, channel geometry may be designed to allow the cable to remain recessed within the liner channel during installation (see FIGS. 8a–8b). This affords the cable member protection, overcoming concerns regarding integrity.

Electrically conductive members may be used to supply electric power and data to remote locations. This is a benefit in many applications. It is well illustrated by an offshore production pipeline. An important utility of the electrically conductive member is gained when the member is a heat trace cable, known to the art. Heat from electrical resistance can be provided at any or air points along the line. Specific segments may be heated by defining sections in the cable member system and providing necessary switching for the current to address individual portions. Accordingly, the fluid in transit can be maintained within a desired temperature-viscosity range for flow optimization.

Figure 14:
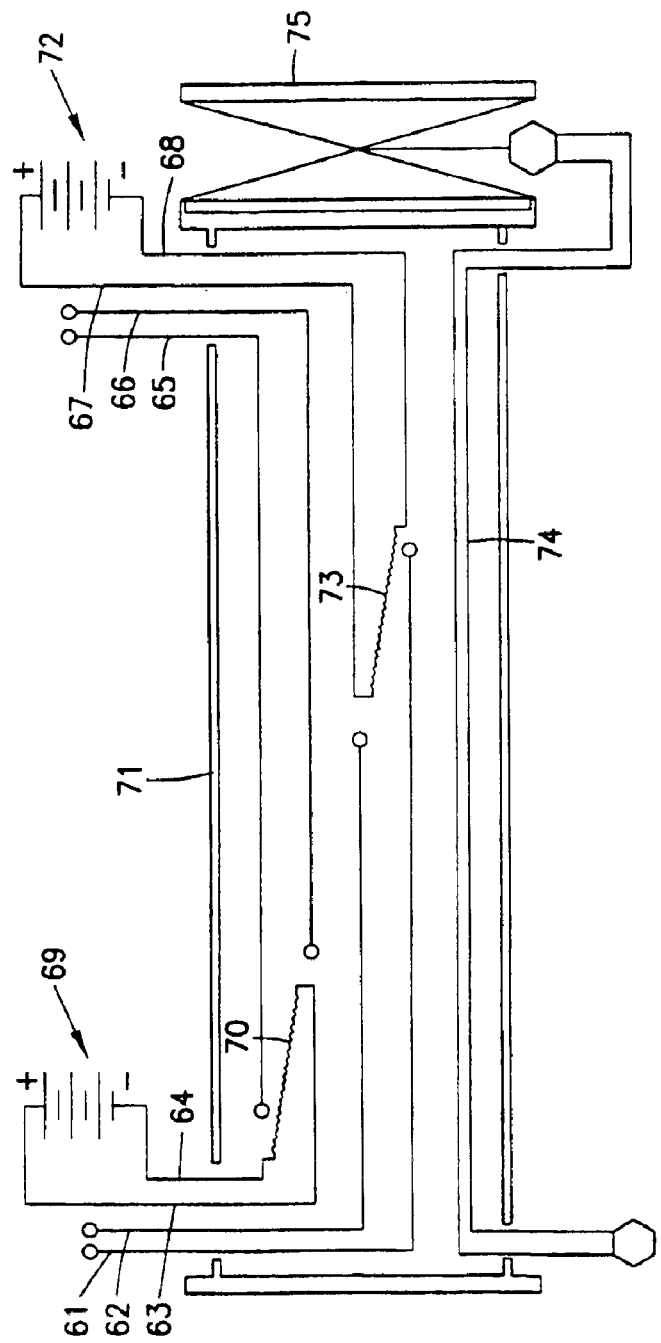
FIG. 14 schematically illustrates a liner with a plurality of electrically conductive cable members, and conductive polymer heating elements for heating the liner.

FIG. 14 shows a host pipe 60 with a liner 71 containing electrically conductive cable members 61–68. Note that members 64 and 65, for example, are disposed in a single channel in this embodiment. They are electrically discontinuous as shown, but can be mechanically connected by a suitable insulator or insulating material so that the combined members 64 and 65 can perform the mechanical pulling functions described hereinabove. Members 63, 64 are connected to a power source 69 for supplying power to a heating element 70 within the liner 71. A second power source 72 is connected by members 67, 68 to a second heating element 73. Members 61, 62, 65 and 66 are not used for electrical connections in this embodiment.

Figure 15A:
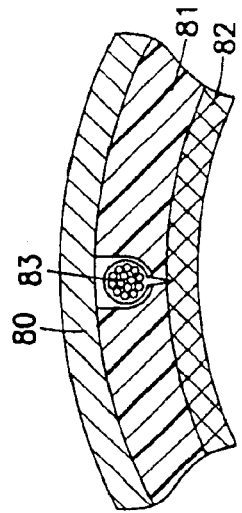
FIG. 15a and 15b are cross-sectional views showing respective examples of conductive polymer heating elements.
Figure 15B:
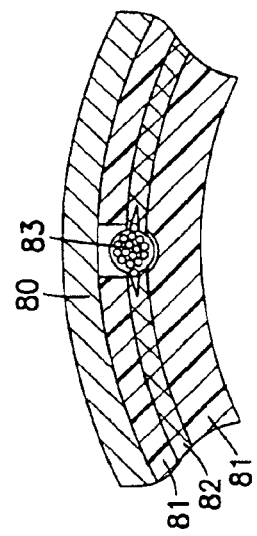
Figure 16A:
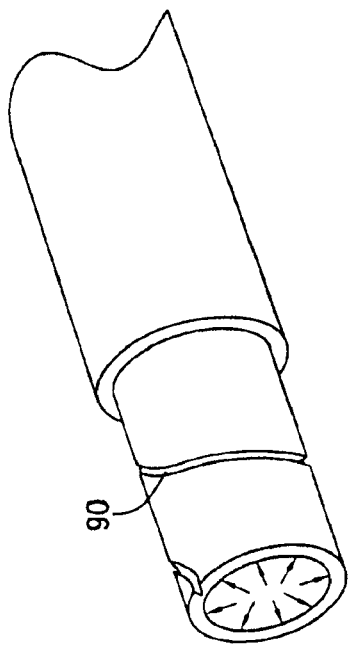

In this embodiment, the heating elements 70, 73 comprise conductive polymers with thermo-variable electrical resistance, preferably having a positive temperature coefficient of resistance, as known to the art, which are incorporated as part of the liner. See FIGS. 15a–15b, which show two examples of host pipe 80, a polymer liner 81, a conductive polymer layer 82 and a conductive cable member 83. The cable member 83 is connected directly to the liner at discrete locations, and transfers electrical power to the conductive polymer layer 82, which thereupon heats up, and in turn transfers heat to the fluid.

Figure 19:
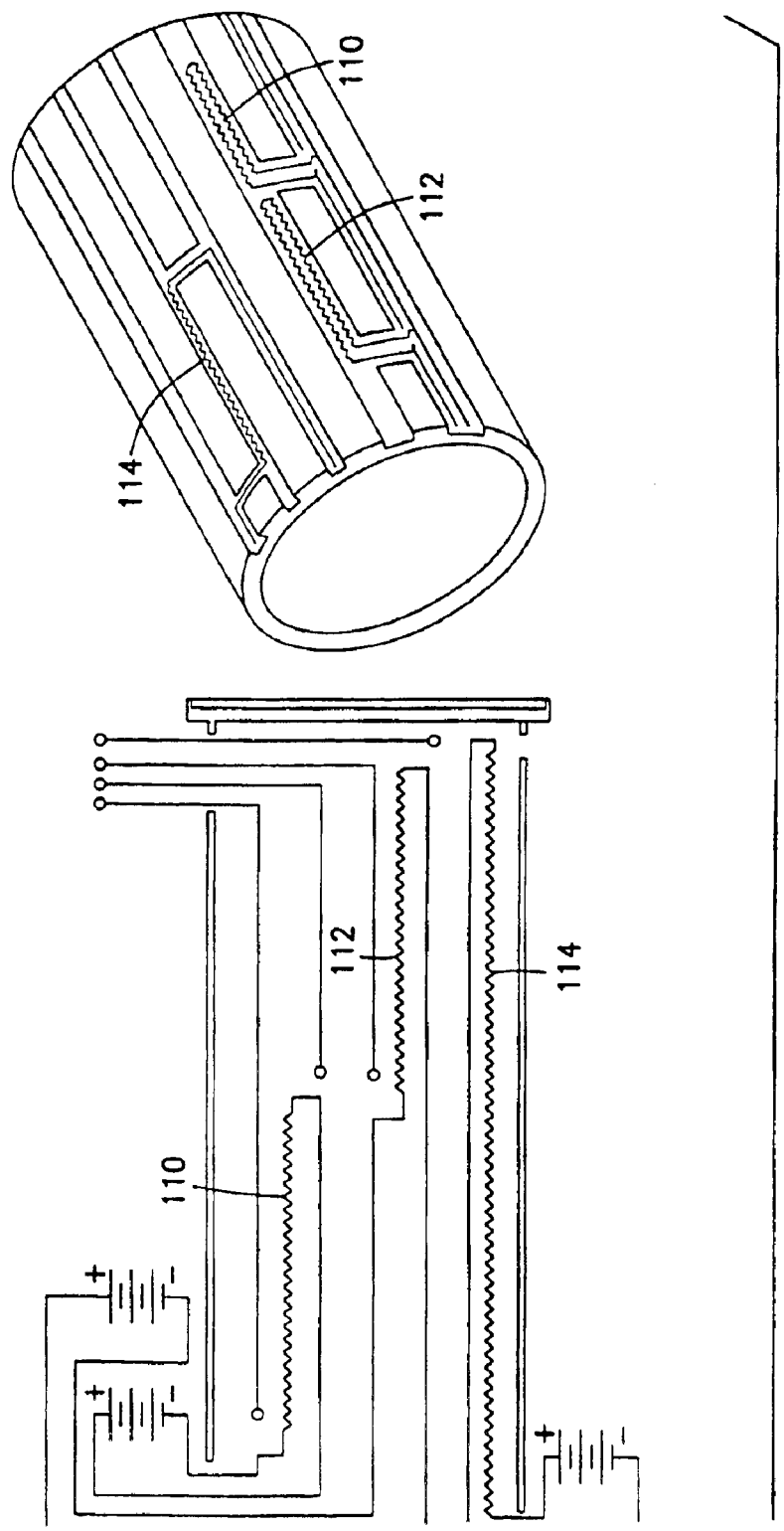
FIG. 19 schematically illustrates an alternate embodiment with electrically conductive cable members and tracing cable heating elements in the liner.

FIG. 19 shows another embodiment which has elongated heating elements 110, 112, 114, such as resistance wires, rather than conductive polymer sheet material. In other respects, the embodiment of FIG. 19 is the same as that in FIGS. 14–15b. The heating elements are disposed longitudinally, possibly in channels formed in the liner. The respective conductors and heating elements can be disposed either in the same channels or in different, possibly adjacent channels.

In another application, a conductive member 74 supplies electricity to a power flow control valve 75 or another downhole device located at a remote underwater wellsite, which makes a separate service line or umbilical unnecessary. As the cable member, fully protected by the host pipe, can perform the same service, it makes the extra line redundant and thus reduces overall project cost.

Similarly, with the electrically and/or optically conductive member 74, data transmission capabilities may be readily effected, with similar benefits.

Another important application for the invention as related to data transmission is in petroleum exploration, specifically enhancing 'measurement while drilling' systems. See FIG. 22 in PCT/US99/16612, referenced above. Currently, large quantities of acquired data are generally stored in downhole tools and analyzed upon withdrawal of the string of tubulars. This is because 'real-time' data transmission rates are extremely slow, e.g., 50 baud, due to acoustic signal attenuation when the drilling fluid is used as the communications medium. A conductive cable member, deployed in a liner channel, and fully protected by the liner and the host tubular, permits a highly desirable increase the data stream rate, e.g., to 56 K baud or more. The member(s) and liner may be inserted in a single long section of tubing, e.g., 25,000 feet long for example, for drilling with continuous coiled tubing. Alternatively, they may be inserted in conventional tubing lengths, with couplings known in the art being provided to maintain signal continuity in the joint areas. The same methodology can be applied to essentially horizontal tubulars. e.g., pipelines connected in series.

In addition to promoting improved fluid flow properties, by assisting in heatng the liner as described above, conductive members may also be employed to reduce/remove blockages in the pipeline such as hydrates and/or wax accumulations. In such an instance, the location of the blockage is determined (as shown for example in the cross-referenced patent disclosures) and then electrical power is applied to heat the problematic area, as described above. This reduces the blockage by melting or subliming it, permitting flow to resume normally.

The current invention also allows cable type members disposed within the channels to be used to locate blockages in the line, primarily by means of two important features. First, as described above, the channel provides a protective close-tolerance envelope during installation for the members required locate blockages. Second, signal characteristics, electrical or optical, through said members change in conjunction with changes in the operating conditions in the pipeline. Accordingly, signal data, which is indicative of specific sets of operating conditions, is obtained and analyzed to predict the location of the problem.

By illustration, when the line shifts from normal operations mode, i.e., a fully flowing line, to that when a blockage forms, the physical stresses felt by the member are also changed. The portion of the member upstream of the blockage will be under greater compressive stress than the area downstream, due to higher line pressure transmitted through both liner and member, as discussed above.

Electric strain gauge characteristics, known to the art, may be employed in the electrically conductive member. Electrical resistance of the member will vary in accordance with stress. See FIG. 16. In this embodiment, a cable member 90, disposed in a channel helically oriented along the length of the liner, is both stretched and compressed upstream of the blockage, in area "B." Downstream, in area "A" pressure and tension are not so pronounced. FIG. 16a–16d are isometric schematic and cutaway views illustrating differential stress configurations on the member. Both types of distortion affect the transmission properties of the cable member, i.e., differential resistance. The data can be compared to baseline resistance for analysis and blockage location determination. In order to further refine the accuracy of location, pressures upstream and downstream of the blockage may also be manipulated.

The following is a description of the blockage detection feature of the invention, as illustrated in the schematic of FIGS. 16a–16d.

The effects as described below are most evident where the members are conductive cables that are spirally wound around the liner along the liners entire length and laid within a channel. Accordingly, this serves as the preferred embodiment, and is used for illustration purposes. Notwithstanding, the utility may be gained through other variations and embodiments, e.g., with the cable laid longitudinally, etc., possibly requiring greater discernment capabilities in the measurement equipment.

Within the normal range of operating conditions for the system, the cable as laid in the channel achieves an equilibrium length. The liner is pressed outward to the host pipe, and as it does so, the cable is stretched to a static length by virtue of its intimate proximity to the liner. The relative position of the components of the system is illustrated in transverse cross section in FIG. 16b.

When an electric current is passed in a circuit made by the cable so disposed in equilibrium, an essentially constant resistance may be recorded. An instrument, e.g. ohmmeter, to effect this may be located at one or both ends of the circuit, the letter illustrated in the figure.

Algebraically:

$$R=Lr$$

where, R is total resistance
L is total cable length
r is unit resistance

Pipeline length may also be correlated directly to the known cable length and resistance according to cable layout geometry within the system. In the case where spiral winding is constant per unit length of pipe:

$$D=f(L), \text{ or,}$$

$$D=f(R/r)$$

where, D is the length of pipeline
f is a mathematical function which is related to the materials and geometry employed Other cable layout geometries may require other unique functions to relate cable length and distance, but the principle remains the same.

With an increase in pressure, the cable will be physically affected which will in turn result in a change of electrical resistance. This is due to the fact that the height of the liner channels will be reduced in reaction to the increased pressure, and thus the cable will be likewise displaced, illustrated in transverse cross section in FIG. 16d. In the case of the spirally wound cable, the net effect is that the cable will lengthen and correspondingly reduce in cross sectional area. Other cable laydown configurations will exhibit corresponding deformations, unique to the geometry. In any event, however, a change in total resistance will be evident.

Algebraically:

$$R'=L'r'$$

where, R' is the new total resistance
L' is the modified cable length, varying according to layout and pressure
r' is the modified unit resistance, if appropriate, relative to cable type and layout In the practical and relevant aspect, when a blockage occurs within the bore of the line, pressure will increase only upstream of the location. Thus the physical effects to the cable will be evident on this side as well.

Algebraically:

$$R''=L''r''$$

where, R" is the total resistance of the cable in the blocked pipe system
L" is the modified cable length, varying according to layout and pressure
r" is the modified unit resistance, if appropriate, relative to cable type and layout If electrical resistance properties for the cable are known, the location of the blockage can be determined by algebraic manipulation. As an example, using the simple case where the unit resistance change is negligible, i.e., $r \approx r' \approx r''$:

$$d=D \times [(R''-R)/(R'-R)]$$

where d=the distance to the blockage, as measured from the end of the pipe having greater pressure.

This example, though simplistic, is provided to demonstrate the principles of the invention. As indicated above, however, other factors, e.g., materials employed, conductor configuration, operational temperature and pressure range, etc., may suggest an appropriate modification to the algebraic formulation in order to effect a solution for a particular set of variables.

Figure 17:
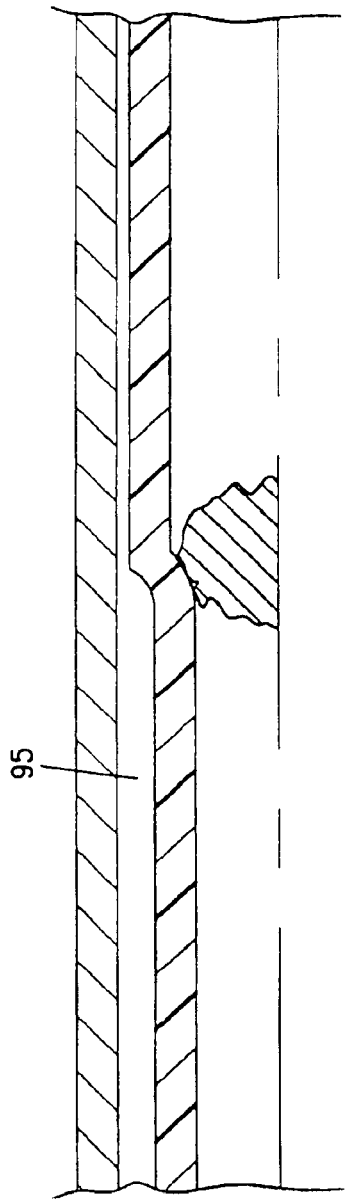

FIG. 17 illustrates a fibre-optic system analogous to the electrical conductive member case described above. In this case the annular member 95 comprises one or more glass fibers, or other internally reflective material whose nominal properties relating to indices of internal reflectivity are available.

Analogous to the electrically conductive case where the resistance changes; when the fibre member is deformed, properties relatng to its internal reflective index are subject to change. This physical change results in a measurable change of characteristics when a light signal is introduced to the fibre and thereafter detected. Such changes, e.g., light intensity, reflection circuit time, wavelength changes, etc., can be measured with suitable instrumentation.

As in the above case, deformation of the fibre can result from a compartmentalized pressure excursion owing to the formation of a blockage within the pipe bore and subsequent influence on liner geometry.

As the fibre light conducting properties are known, and can be measured in a nominal, pre-blockage state, and also after a blockage, the differences in the resulting signals can be mathematically analyzed, in a fashion related to the electrically conductive member case, to resolve the position of the blockage along the pipeline.

Unlike the electrically conductive case, however, the preferred embodiment is that the fibre optic members be laid in a relatively straight fashion in the annulus, parallel to the longitudinal axis. This is to minimize compounding of torsional stresses upon insertion, and to minimize cost. Notwithstanding, other layouts, such as the helically wound one mentioned above will be functional.

Although embodiments of the invention have been described herein, the invention is not limited to such embodiments, but rather includes all modifications and variations that may occur to one having the ordinary level of skill in the art.

What is claimed is:

1. A method of assembling a tubular system,
the tubular system comprising a tubular; a liner in the tubular, the liner having an outer wall engaging an inner wall of the tubular, the liner having an inner wall defining a hollow bore; and at least one elongated member disposed between said liner and said tubular and defining a fluid flow passage between said liner and said tubular;
said method comprising the steps of:
placing said liner and said member in contact with each other, by placing a predetermined initial stress on said liner so as to induce a strain; and then adhering said liner and said member to each other; and
while said liner and said member are in contact, pulling on said elongated member in order to pull said liner and said elongated member together into said tubular;
wherein in said pulling step, said liner is pulled along with said member into said tubular without inducing substantial additional strain on said liner.

2. The method of claim 1, wherein after said pulling step, said member is disposed between said outer liner surface and said tubular and thereby deforms said liner so as to define said fluid flow passage.

3. The method of claim 1, wherein said member is disposed in a channel which is formed in a surface of said liner.

4. The method of claim 1, wherein said adhering step comprises the step of providing barbs on said member.

5. The method of claim 1, wherein said adhering step comprises the step of applying heat to said member.

6. The method of claim 5, wherein said adhering step further comprises the step of applying an adhesive between said member and said liner.

7. The method of claim 5, wherein said heat is applied by passing an electric current through said member.

8. The method of claim 5, wherein said heat is applied by radiation from the exterior of said liner.

9. The method of claim 1, wherein said adhering step comprises the step of applying an adhesive between said member and said liner.

10. The method of claim 1, wherein said member is disposed in a channel which is formed in said outer surface of said liner, and
wherein said adhering step comprises the steps of disposing said member in said channel, then radially compressing the liner so that said channel grips said member.

11. The method of claim 10, wherein said member comprises a cable.

12. The method of claim 11, wherein said member comprises a generally helical spring.

13. The method of claim 12, wherein said spring has a spring constant which is stiffer than a modulus of elasticity of said liner so that said liner is pulled by said member into said tubular without placing substantial additional strain on said liner.

14. The method of claim 10, wherein said member when in said channel is disposed fully inside said outer surface of said liner.

15. The method of claim 14, wherein said member is adhered to said liner sufficiently to remain in said channel.

16. The method of claim 10, wherein said member is adhered to said liner sufficiently to remain in said channel.

17. The method of claim 10, further comprising the step of making said member of a sufficiently strong material to resist deformation of said channel due to increased pressure in said liner bore.

18. The method of claim 10, further comprising the step of making said member of a sufficiently strong material to resist deformation of said channel due to thermal softening of said liner.

19. The method of claim 10, further comprising the step of making said member of a sufficiently strong material to resist deformation of said channel due to swelling of said liner upon contact with materials in said liner bore.

20. The method of claim 10, wherein said member and said liner are pulled into said tubular with said liner still compressed.

21. A tubular system with internal heating, comprising:
a host tubular;
a liner in the tubular, the liner having an outer wall engaging an inner wall of the tubular, the liner having an inner wall defining a hollow bore; and
at least one electrically conductive elongated member disposed between said host tubular and said liner;
said liner comprising an electrical heating element connected to said at least one elongated member for receiving electrical current from said elongated member and thereby heating said tubular system;

wherein said tubular system is assembled by the steps of:

placing a predetermined initial stress on said liner so as to induce a strain; and securing said liner and at least one elongated member to each other; and then pulling on said member, so that said liner is pulled, along with said member, into said tubular without inducing substantial additional strain on said liner.

22. The tubular system of claim 21, the liner having at least one channel formed therein, said member being disposed in said at least one channel.

23. The tubular system of claim 22, wherein said electrical heating element is a conductive polymer layer which has an electrical resistance and forms a part of said liner.

24. The tubular system of claim 22, wherein said electrical heating element is an electrically resistive wire disposed in said at least one channel.

25. A method of determining the location of a blockage in a tubular system, the tubular system comprising:

a tubular; and a liner in the tubular, the liner having at least one channel formed therein; an outer wall of the liner engaging an inner wall of the tubular; the liner having an inner wall defining a hollow bore;

wherein said tubular system is assembled by the steps of placing a predetermined initial stress on said liner so as to induce a strain;

then adhering said liner to at least one elongated member; and then pulling on said member, so that said liner is pulled, along with said member, into said tubular without inducing substantial additional strain on said liner;

said method comprising the steps of:

placing at least one elongated sensing member in said at least one channel, said sensing member being responsive to pressure in said hollow bore within said liner, said pressure being indicative of said location of said blockage;

applying an input signal to said sensing member; and receiving an output signal from said sensing member and processing said output signal to determine said location of said location of said blockage.

26. The method of claim 25, wherein said sensing member comprises an electrical strain gauge and said input and output signals are electrical.

27. The method of claim 25, wherein said sensing member comprises at least one optical fiber and said input and output signals are optical.

28. A method of assembling a tubular system, the tubular system comprising a tubular; a liner in the tubular, the liner having an outer wall engaging an inner wall of the tubular, the liner having an inner wall defining a hollow bore; and at least one elongated member which is disposed between said liner and said tubular and defines a fluid flow passage between said liner and said tubular;

said method comprising the steps of:

placing said liner and said member in contact with each other;

while said liner and said member remain in contact, pulling said liner into said tubular;

wherein said contact between said elongated member and said liner protects said elongated member from deformation while being pulled into said tubular;

wherein said member is disposed in a channel which is formed in said outer surface of said liner, and wherein said adhering step comprises the steps of disposing said member in said channel, then compressing said channel so that said channel grips said elongated member.

29. The method of claim 28, wherein said member and liner are pulled into said tubular with said channel still compressed.

30. The method of claim 28, wherein said channel is compressed by radially compressing said liner.

31. The method of claim 30, wherein said member and said liner are pulled into said tubular with said liner still compressed.

* * * * *